United States Patent [19]

Gruber

[11] 4,388,547
[45] Jun. 14, 1983

[54] CURRENT GENERATOR

[76] Inventor: John R. Gruber, 1421 E. 32 St., Cleveland, Ohio 44114

[21] Appl. No.: 216,619

[22] Filed: Dec. 15, 1980

[51] Int. Cl.³ ............................................. H02K 1/22
[52] U.S. Cl. ................................ 310/266; 310/68 R; 310/154; 310/223
[58] Field of Search ............... 310/179, 177, 158, 165, 310/68 R, 68 D, 166, 224, 46, 266, 154, 232, 234, 237, 128, 130, 203, 198, 207, DIG. 6, 223

[56] References Cited

U.S. PATENT DOCUMENTS

| 2,860,267 | 11/1958 | Hayes | 310/266 |
|---|---|---|---|
| 2,969,491 | 1/1961 | Pell | 310/165 |
| 3,159,760 | 12/1964 | Olofsson | 310/268 |
| 3,259,768 | 7/1966 | Burr | 310/13 |
| 3,426,224 | 2/1969 | Esters | 310/46 |
| 3,462,626 | 8/1969 | Kluss | 310/266 |
| 3,549,919 | 12/1970 | Spisak | 310/68 R |
| 3,602,749 | 8/1971 | Esters | 310/266 |
| 3,668,452 | 4/1971 | Hu | 310/266 |
| 4,051,402 | 8/1977 | Gruber | 310/266 |
| 4,087,713 | 5/1978 | Binder | 310/266 |
| 4,114,057 | 9/1978 | Esters | 310/266 |

FOREIGN PATENT DOCUMENTS

| 1226705 | 11/1960 | Fed. Rep. of Germany | 310/234 |
|---|---|---|---|
| 203508 | 9/1964 | Sweden | 310/68 R |

*Primary Examiner*—R. Skudy
*Attorney, Agent, or Firm*—Fay & Sharpe

[57] ABSTRACT

A high current, low voltage generator is constructed of four pairs of rotatably mounted magnetic pole members. The pairs of magnetic pole members are disposed longitudinally along and at angular intervals around a cylindrical air gap region. The angular intervals between adjacent pairs of magnetic pole members alternates between 85½° and 94½°. A plurality of non-ferrous, conductive segments of a cylindrical, stationary armature are disposed in the air gap region. Rotation of the magnetic pole members around the armature causes the conductive segments to cut the flux lines of the pole pairs inducing electric currents. An electrical circuit connects in series the four segments which are cutting the flux lines of the four pairs of magnetic pole members.

13 Claims, 5 Drawing Figures

CURRENT GENERATOR

BACKGROUND OF THE INVENTION

This application pertains to the art of dynamoelectric conversion apparatus and more particularly to an apparatus for converting mechanical energy into electrical energy. The invention is particularly applicable to generators for generating a relatively high current with a relatively low voltage and will be described with particular reference thereto. It will be appreciated, however, that the invention has broader applications such as AC or DC power generation with various voltage and current relationships, and the like.

Current generators have included a rotor which is moved with respect to a magnetic field. The rotor, must commonly, comprises a plurality of coil windings which may be wound around a thin nonmagnetic member, note for example U.S. Pat. No. 2,860,267 to Hayes. Some dynamoelectric machines have rotors constructed of a tubular nonmetallic material supporting windings of a printed circuit type, note for example U.S. Pat. No. 3,668,452, issued Apr. 5, 1971 to P. Y. Hu. See also U.S. Pat. No. 3,259,768, issued July 5, 1966 to R. P. Burr.

The prior art rotor constructions present several problems. The cross-sectional area of coil-wound rotors is limited by two factors. The first factor is that for a given magnetic polar pair gap, the size of the conductive coil cross-sectional area is limited by the necessity of a nonconducting supporting material. The second cross-sectional area limiting factor is the configuration of the coils. Coils having a circular cross section do not achieve the most efficient utilization of the space within the magnetic polar pair gap. In the case of the printed circuit type windings, the cross-sectional area of the conductors is limited by both the presence of the nonconducting supporting material and by the inherent thinness of the printed circuit type windings.

The present invention is also an improvement over the D.C. generator shown in my prior U.S. Pat. No. 4,051,402, issued Sept. 27, 1977. That patent utilized a brush for each polar pair of magnetic members. Because brushes have a high resistance, they absorb energy from the current flowing through them reducing the efficiency of the generator. Further the brushes contacted the rotor cylinder directly necessitating replacement of the whole cylinder when the wear became excessive.

The present invention contemplates a new and improved dynamoelectric apparatus which overcomes the above-referenced problems and others. The present invention provides a current generator which is very efficient in its conversion of mechanical energy to electric power.

SUMMARY OF THE INVENTION

In accordance with the present invention there is provided a dynamoelectric apparatus which comprises a plurality of pairs of magnetic pole members disposed longitudinally along and at angular intervals around a cylindrical air gap region. The magnetic pole members of each pair produce magnetic flux lines which cross the air gap region. A plurality of non-ferrous, conductive segments extend longitudinally in the air gap. Relative rotational movement between the pairs of magnetic pole members and the conductive segments causes the flux lines to be cut by the conductive segments which induces electrical currents therein. An electrical connecting circuit connects the conductive segments with an electrical output.

In accordance with one aspect of the invention, the angular intervals between the pairs of magnetic pole members are not all the same.

In accordance with another aspect of the invention, the electrical connecting circuit connects at least four conductive segments in series across the electrical output.

A principal advantage of the present invention is that it provides a mechanical to electrical energy conversion apparatus which has a high efficiency, on the order of 95% or better. It is ideally suited to be driven by windmills, Stirling engines, waterwheels, and the like.

Another advantage of the present invention is that it produces a high amperage current with a relatively low voltage. It is ideally suited for use in conjunction with electrolysis, electroplating, electrical resistance heating, and the like.

Yet another advantage of the present invention is that it minimizes the number of high resistance brushes. Still other advantages will become apparent to others upon reading and understanding the following description of the preferred embodiment.

BRIEF DESCRIPTION OF THE FIGURES

My invention may take form in various physical parts and arrangements of parts. The FIGURES are for the purposes of showing a preferred embodiment of the present invention and should not be construed as in any way limiting the invention.

DESCRIPTION OF THE PREFERRED EMBODIMENT

Figure 1:
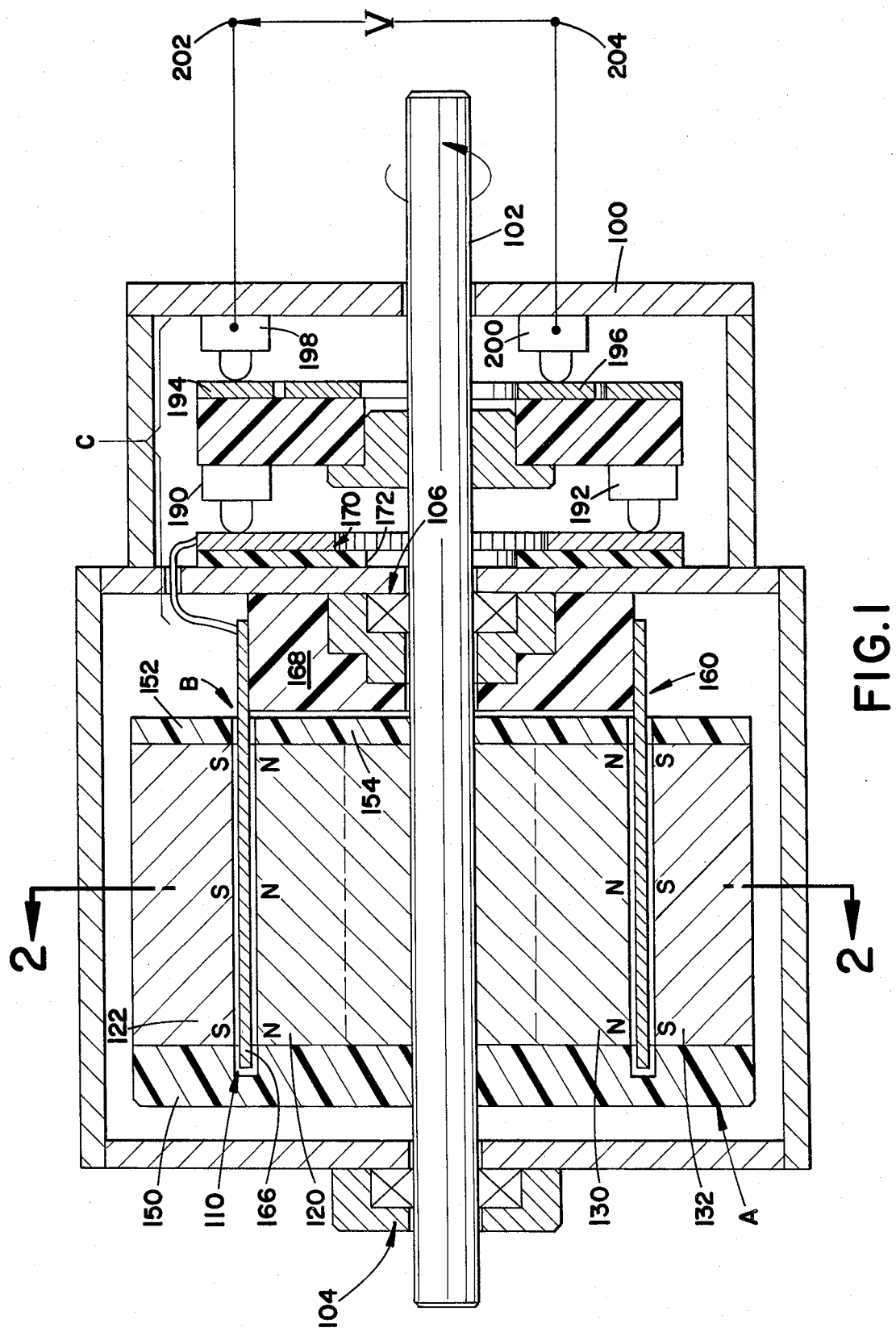
FIG. 1 is a full sectional view of a preferred embodiment taken along section line 1—1 of FIG. 2 and showing details of its construction.
Figure 2:
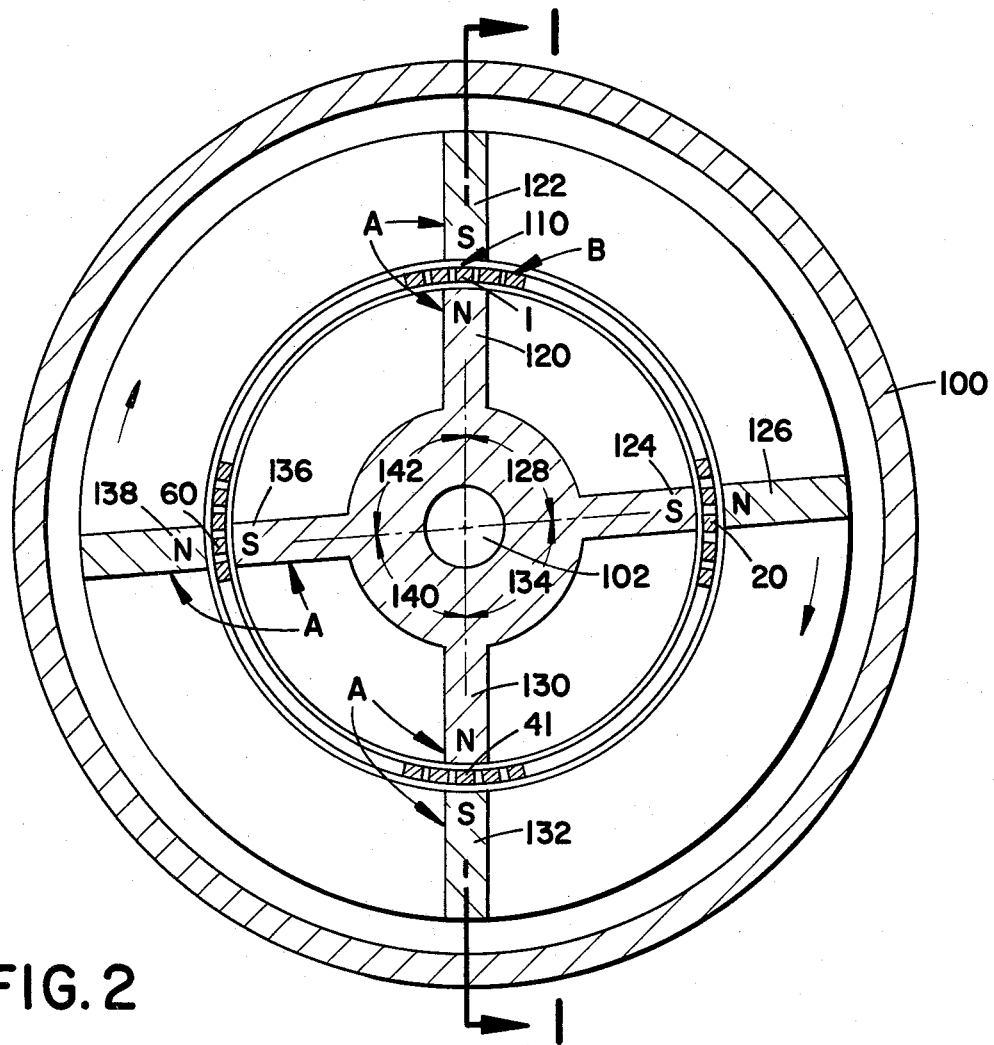
FIG. 2 is a sectional view transverse to the section of FIG. 1 and taken through section line 2—2 of FIG. 1.

The assembly of the preferred embodiment of the dynamoelectric apparatus is illustrated in FIGS. 1 and 2. The apparatus includes a plurality of pairs of magnetic pole members A for producing magnetic flux lines. An electrical current flow is induced in an armature B, best illustrated in FIG. 3, by relative rotational movement between the armature and the magnetic flux lines produced by the pairs of magnetic pole members. An electrical connecting circuit C, best illustrated in FIGS. 4A and 4B, interconnects the armature B with an electrical output or input.

With particular reference to FIGS. 1 and 2, the apparatus includes a housing or frame structure 100 which is journalled to receive an elongated shaft 102 which extends along a longitudinal axis. In the preferred embodiment, the frame structure 100 is stationarily mounted and the shaft 102 is connected with a source of rotational mechanical energy. A pair of bearings 104 and 106 facilitate relative rotational movement about the longitudinal axis between the housing 100 and shaft 102.

With particular reference to FIG. 2, the plurality of pairs of magnetic pole members A are disposed longitudinally along and at angular intervals around a cylindrical air gap region 110. In the illustrated embodiment, there are four pairs of magnetic pole members. However, the invention contemplates that the number of pairs of magnetic pole members may be any multiple of two, such as 4, 6, 8, 16, or the like. Preferably the magnetic numbers are permanent solid steel magnets, although laminated steel magnets, electromagnets, or the like could also be used. A first pair of magnetic pole members has magnetic pole members 120 and 122 disposed with opposite polarity faces in close proximity producing flux lines across the cylindrical air gap region 110. A second pair of magnetic pole members has magnetic pole members 124 and 126 disposed with opposite polarity faces in close proximity across the air gap 110. The first and second pairs of magnetic pole members are displaced around the cylindrical air gap region by an angular interval 128. A third pair of magnetic pole members has magnetic pole members 130 and 132 disposed with faces of opposite polarity in close proximity across the air gap region 110. The second and third pairs of magnetic pole members are displaced around the cylindrical air gap region by an angular interval 134. A fourth pair of magnetic pole members has magnetic pole members 136 and 138 disposed longitudinally with faces of opposite polarity in close proximity to each other across the air gap region 110. The third and fourth pairs of magnetic pole members are spaced around the cylindrical air gap region by an angular interval 140. The first and fourth pairs of magnetic pole members are spaced apart by an angular interval 142. In the illustrated embodiment, the angular intervals 128 and 140 are 85½° and the angular intervals 134 and 142 are 94½°. The details of the relationships between angular intervals 128, 134, 140 and 142 are explained in greater detail below.

With particular reference to FIG. 1, the inner magnetic pole member of each pair, pole members 120, 124, 130, and 136, are connected with the shaft 102 to be rotated therewith. A first insulating disc 150 interconnects the shaft 102, the inner magnetic pole member of each pair, and the outer magnetic pole member of each pair. The insulating disc 150 causes the outer magnetic pole members to rotate along the air gap region 110 with the inner magnetic pole members as the shaft 102 rotates. An annular insulating member 152 is connected with the outer magnetic pole members to maintain them parallel to the longitudinal axis. A second annular insulating member 154 is connected with the inner magnetic pole members to maintain them parallel to the longitudinal axis.

Figure 3:
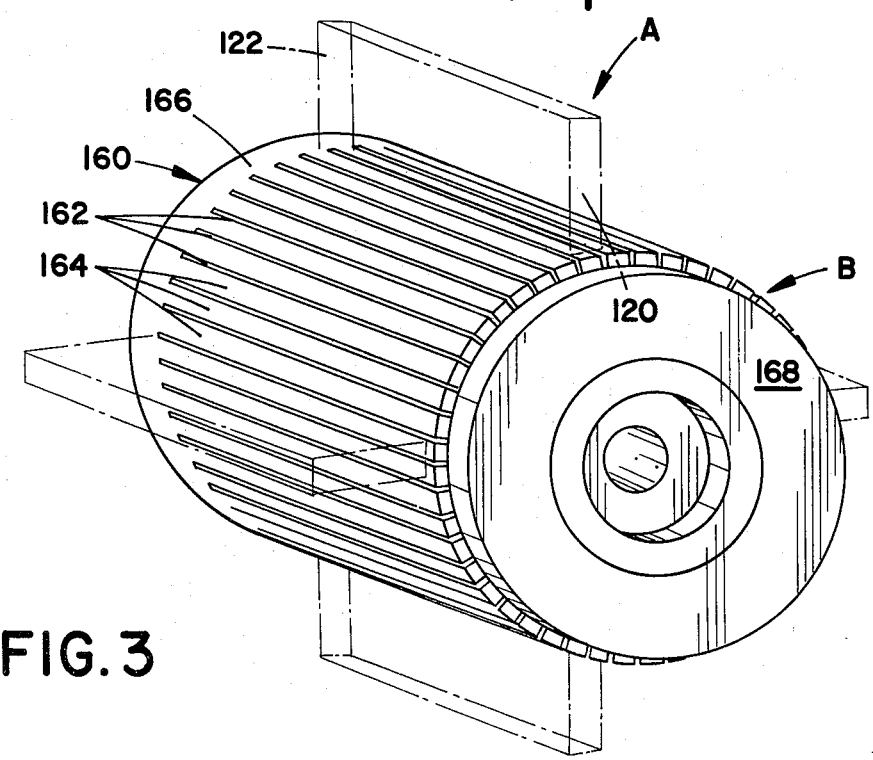
FIG. 3 is a pictorial view of a preferred embodiment of the stationary armature tube construction of FIGS. 1 and 2.

With continued reference to FIGS. 1 and 2 and further reference to FIG. 3, the armature B includes an electrically conductive tubes 160 which has a plurality of longitudinal slits 162. The longitudinal slits 162 define a plurality of electrically conductive segments 164 extending longitudinally therebetween. The slits 162 do not extend the entire longitudinal length of the tube 160. An annular unslit ring 166 electrically connects a first end of each of the conductive segments 164. The ring 166 further assists in maintaining the conductive segments in longitudinal alignment. In the preferred embodiment, the tube 160 is constructed of copper although other non-ferrous, conductive materials such as aluminum are contemplated. The tube 160 is disposed into the air gap region 110.

Each of the conductive segments 164 has a second end which is mounted on an insulating member 168. The insulating member 168 is secured to the housing 100 to constrain the tube 160 in a stationary, fixed position. The housing 100, shaft 102, insulating disc 150, annular insulating members 152 and 154, insulating member 168 and bearings 104 and 106 comprise means for allowing relative rotational movement between the pairs of magnetic pole members and the conductive segments. Specifically, the rotation of shaft 102 causes a rotation of the plurality of pairs of magnetic pole members A around the air gap region 110. As the rotating lines of magnetic flux are cut by each stationary conductive segment 164, a current flow is induced longitudinally along the conductive segment. It will be appreciated that the relative rotational movement between the magnetic flux lines and the armature B may be achieved by rotating the armature B and holding the magnetic field generating means A stationary. However, rotating the magnetic pole members has been found to be advantageous for two reasons. First, centrifugal force, particularly at high speeds, tends to deform the shape of the tube 160. Second, the inertia of the heavy magnetic pole members tends to keep the shaft 102 rotating at a relatively constant angular velocity.

Figure 4A:
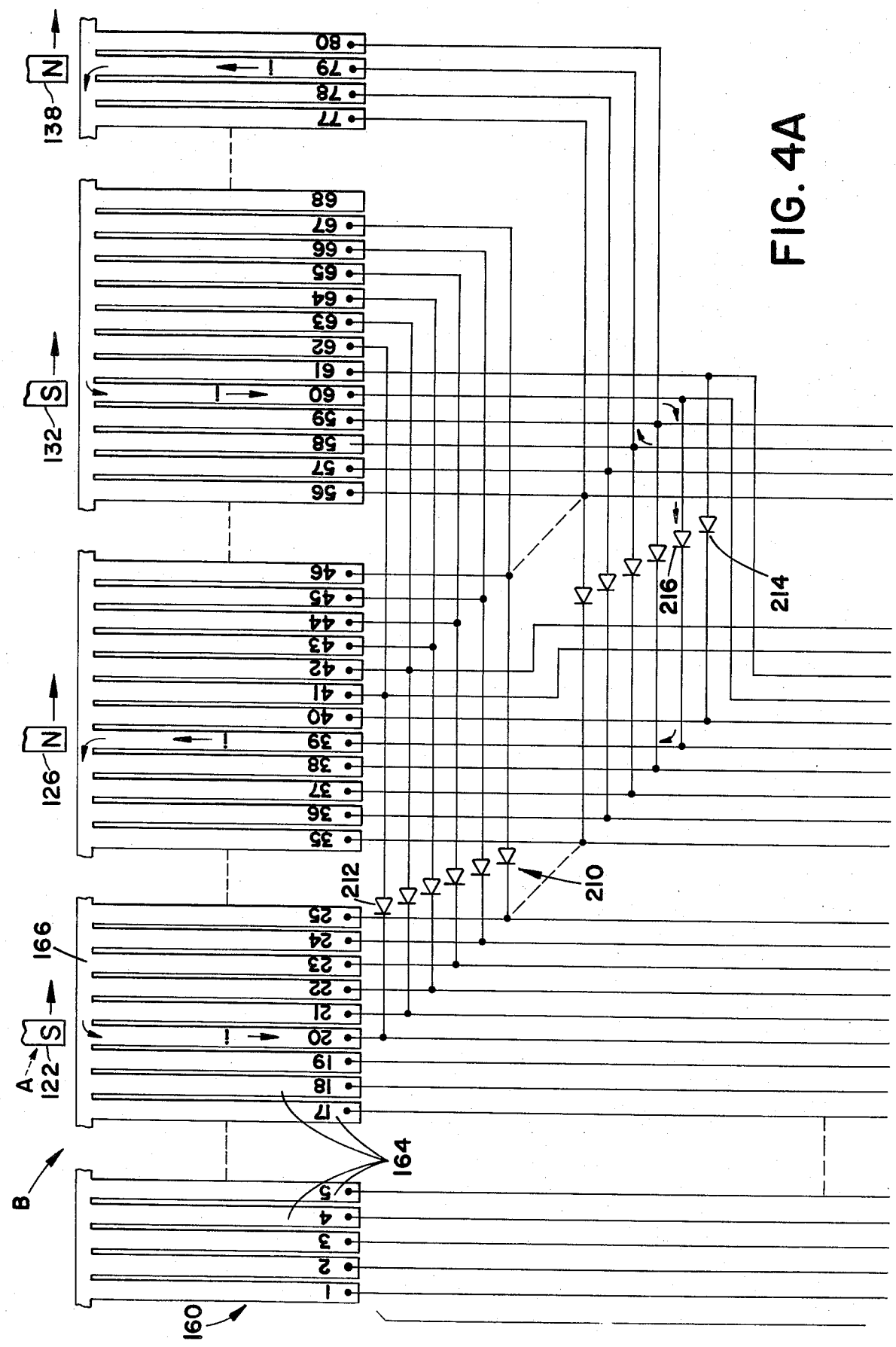
FIGS. 4A and 4B taken together are an electrical wiring diagram which illustrates a preferred electrical connecting circuit which interconnect the armature tube assembly with an electrical output.
Figure 4B:
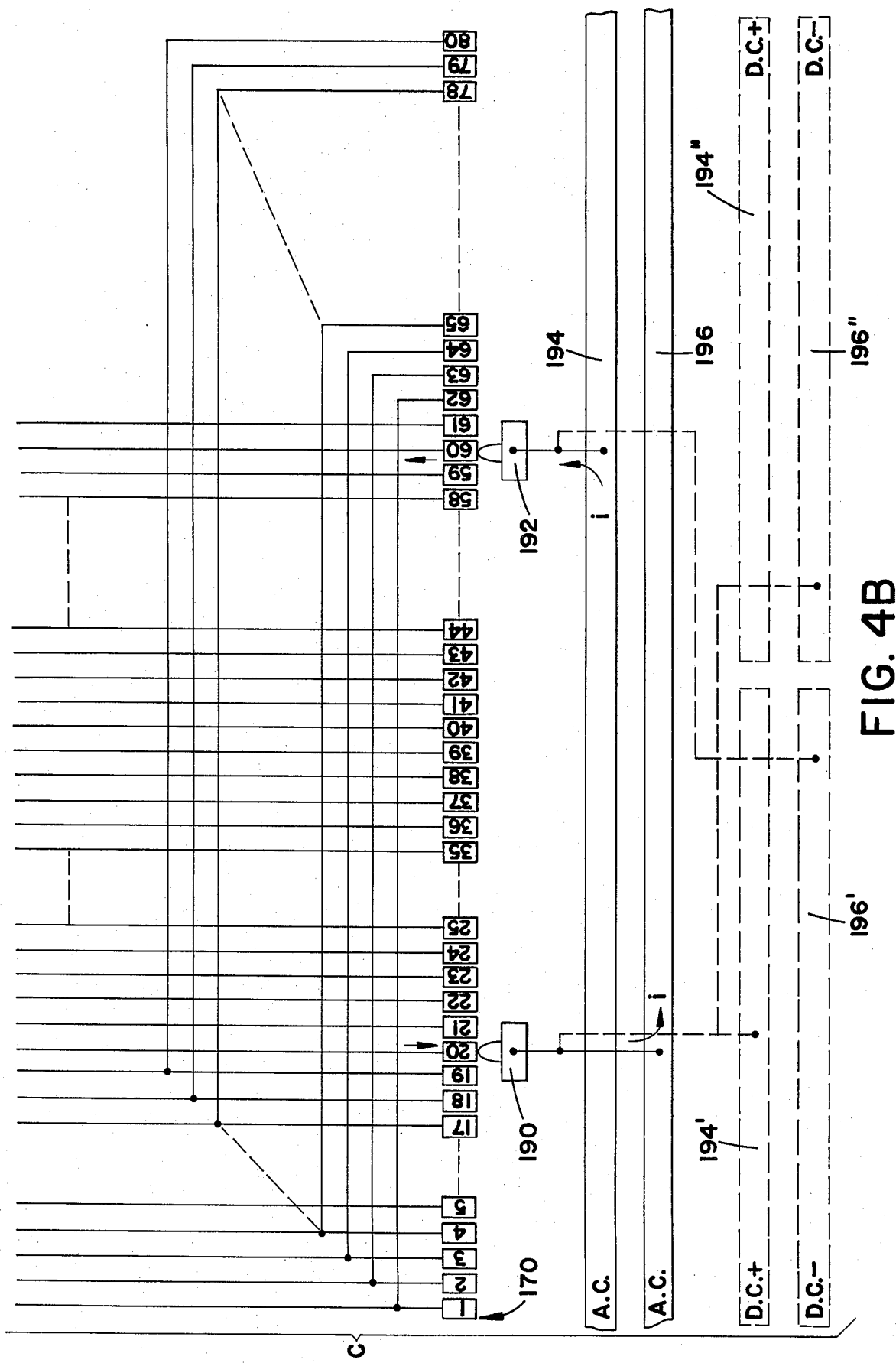

With reference to FIGS. 1, 4A, and 4B, the electrical connecting circuit C includes a commutator assembly. Although the second ends of the conducting segments 164 could function electrically as the commutator assembly, this would cause wear to the segments and in time necessitate replacement of the entire tube 160. Because the tube 160 is relatively difficult and time consuming to manufacture, it is desirable that the commutator assembly be more readily replaceable. Further, using the second ends of the segments 164 as the commutator assembly, requires the number of brushes to match the number of pairs of magnetic pole members. In the preferred embodiment, in which there are four pairs of magnetic pole members, four brushes would be required. The electrical circuit C, illustrated in FIGS. 4A and 4B reduces the number of brushes in the commutator assembly to two.

The commutator assembly includes a commutator ring 170 which is made up of a plurality of commutator contacts. The number of contacts in the commutator ring 170 is the same as the number of conductive segments 164 in the armature B. In the preferred embodiment, there are 80 conductive segments and 80 commutator contacts. The commutator ring 170 is stationarily mounted to the housing 100 by an insulating ring 172, hence in a fixed spatial relationship with the conductive segments 164.

A pair of brushes 190 and 192 are mounted on the shaft 102 for rotation therewith, hence with the plurality of pairs of magnetic pole members. The brushes are diametrically, 180°, opposite to each other to make electrical contact with diametrically opposite commutator contacts. In the preferred embodiment in which there are 80 contacts, the brushes are 40 contacts apart. The first brush 190 is electrically connected with a slip ring 194 and the second brush 192 is electrically connected with a slip ring 196. Third and fourth brushes 198 and 200 make electrical contact with slip rings 194 and 196 respectively. The brushes 198 and 200 remove A.C. electrical power from the slip rings to supply a relatively low voltage with a relatively high amperage output across an electrical output 202, 204.

In FIGS. 4A and 4B, the tube 160, the commutator ring 170, and the slip rings 194 and 196 are represented, for simplicity of illustration, as if they had been cut longitudinally and folded flat. For easy reference, the 80 conductive segments and the corresponding 80 commutator contacts have each been numbered 1 through 80. In their normal working configuration, conductive segment 1 and conductive segment 80 are immediately adjacent. Similarly, commutator contact 1 and 80 are immediately adjacent. The first pair of magnetic pole members is illustrated by pole member 122. Similarly, the second, third, and fourth pairs of magnetic pole members are illustrated by pole members 126, 132, and 138, respectively. In the preferred embodiment, the first and second pairs of magnetic pole members 122 and 126 are spaced apart by a distance corresponding to the width of 19 segments. That is, by a distance corresponding to a quarter of the total conductive segments less 1. Similarly, the second and third pairs of magnetic pole segments 126 and 132 are spaced apart by a distance corresponding to the width of 21 conductive segments. That is, by a distance corresponding to a quarter of the total conductive segments plus 1. The third and fourth pairs of magnetic pole members are spaced apart by a distance corresponding to the width of 19 conductive segments. The first and fourth pairs of magnetic pole members are spaced apart by a distance corresponding to the width of 21 conductive segments.

The first 19 segments, numbered 1-19, comprise a first group of the segments. The next 21 segments, numbered 20-40, comprise a second group of segments. The next 19 segments, numbered 41-59, comprise a third group of segments. The next two segments numbered 60 and 61 comprise a transition set or pair of segments. The last 19 segments, numbered 62-80, comprise a fourth group of segments. The first ends of the segments are electrically connected by ring 166.

The second ends of the conductive segments of the first group, numbered 1-19, are not interconnected with the second ends of any of the segments of the second, third of fourth groups or with each other.

The second group of conductive segments, numbered 20-40, is interconnected with the third group of conductive segments, numbered 41-59, and the pair of segments, numbered 60 and 61. Specifically, the second end of segment 20 is connected with the second end of segment 41 by a diode 212; the second end of segment 40 is connected to the second end of segment 61 by a diode 214; and similarly the second end of each of segments 21-39 are connected through a diode with the second end of segments 42-60, respectively. The diodes enable current flow to flow from the second group of segments to the third group of segments but prohibit current from flowing from the third group of segments back to the second group of segments.

The third group of segments, numbered 41-59, are connected with the fourth group of segments, numbered 62-80. Specifically, the second end of segment 41 is connected by an electrical conductor with the second end of segment 62; the second end of segment 59 is connected by an electrical conductor directly with the second end of segment 80; and, similarly, the second ends of segments 42-58 are connected with the second ends of segments 63-79, respectively. This direct connection allows the current to flow in either direction between the second ends of the third and fourth group.

A first group of commutator contacts, numbered 1-19, is connected with the first group of segments. Specifically, contact 1 is connected with the second end of segment 1; contact 19 is connected with the second end of segment 19; and contacts 2-18 are connected with the second end of segments 2-18, respectively. A second group of commutator contacts, numbered 20-40 is connected with the second group of segments. Specifically, contacts 20-40 are connected directly with the second ends of segments 20-40, respectively. A transition set or pair of contacts numbered 41 and 42 is connected with the second ends of the transition set or pair of segments 60 and 61, respectively. A third group of contacts, numered 43-61, is connected with the fourth group of segments. Specifically, contacts 43-61 are connected with the second ends of segments 62-80, respectively, which are connected with the second ends of contacts 41-59, respectively. A fourth group of contacts, numbered 62-80, is connected with the first group of segments. Specifically, contacts 62-80 are connected with the second ends of segments 1-19, respectively, which in turn are connected with contacts 1-19, respectively.

The electrical connecting circuit C causes the two brushes 190 and 192 to be connected through a current path which includes four segments in series. Each segment in the path is disposed between one of the magnetiic pole pairs. By way of example, take the time when rotation of the pairs of magnetic pole members relative to the tube 160 causes conductive segment 20 to cut the magnetic flux of the first pair of magnetic pole members 120, 122. Rotation of segment 20 through the magnetic flux lines of the first pole pair induces a current flow through segment 20 from its first end to the second end. The second pair of magnetic pole members 124, 126, spaced 19 segments from the first pair of pole members, induces a current in segment 39. The current in segment 39 flows in the opposite direction to the current in segment 20, i.e., from the second end toward the first. The third pair of magnetic pole members 130, 132, spaced 21 segments from the second pair of pole members, induces a current in segment 60. The current induced in segment 60 flows in the same direction as the current in segment 20, i.e., from its first end towards its second end. The fourth pair of magnetic pole members 136, 138, spaced 19 segments from the third pair of pole members, induces a current in segment 79. The current induced in segment 79 flows in the opposite direction to the current in segment 20. In this manner, the four segments which are cutting the flux lines of the four pairs of magnetic pole members each have a current induced in them.

The electric connecting circuit C which includes conductive ring 166 or other means for electrically connecting the first ends of the segments. The electrical connecting circuit C connects in series the segments which are cutting magnetic flux lines of the magnetic pole pairs. Continuing the above example, brush 192 is disposed relative the fourth pair of magnetic pole members 136, 138 such that it is contacting the commutator contact 79. The cutting of the flux lines by segment 79 causes a current to flow from brush 198, through slip ring 194, through brush 192, and through the segment 79 into the conductive ring 166. The cutting of the flux lines by segment 60 causes the current to flow from the conductive ring 166 through segment 60 and a diode 216 to segment 39. The cutting of the flux lines by segment 39 causes the current to flow through segment 39 to the conductive ring 166. The cutting of the flux lines by segment 20 causes the current to flow from the conductive ring 166 through segment 20, to commutator contact 20, through brush 190, through slip ring 196, and to brush 200. The diode 212 prevents the current from segment 20 from shorting to conductive ring 166 by returning along segment 41. Because the pairs of magnetic pole members and the brushes 190 and 192 move in concert, the four segments cutting the flux lines are always be connected in series between the brushes.

It will be appreciated that the number of pairs of magnetic pole contacts need not be four. Rather any multiple of two will achieve analagous results. Similarly the number of segments of the tube need not be 80, although better results are achieved if the number of segments is much larger than the number of magnetic pole pairs. Further the groups of segments need not vary by only one from a quarter of the number of segments. Rather the relationship is more general and may be expressed as:

$$\text{segments per group} = 2SM/2M \pm n = S \pm n, \quad (1)$$

where the number of segments is 2SM, the number of magnetic pole pairs is 2M, and S, M, and n are integers. The size of each transition set is described by:

$$\text{number of transition sets} = M - 1 \quad (2)$$

$$\text{size of each transition set} = 2n \quad (3)$$

With reference to FIG. 2, the angular intervals 128, 134, 140 and 142 are expressed generally by the equations:

$$\text{angles } 128, 140 = ((2SM - n)/2M) \times 360° \quad (4)$$

$$\text{angles } 134, 142 = ((2SM + n)/2M \times 360° \quad (5)$$

When other numbers of segments are used, the relative size of these angles will vary accordingly.

With continued reference to FIGS. 4A and 4B, if it is desired that the current generator generate DC current instead of AC current, the brushes 190 and 192 may be connected with split slip rings. Specifically, brush 190 may be connected with semicircular slip rings 194' and 196' and brush 192 may be connected with semicircular split rings 194" and 196". Alternately, the conductive segments 164 and the pairs of pole members may be arranged around a conical or disc-like air gap region.

A typical output of the generator using four pairs of magnetic pole members, each pole member being of 400 gauss, having a longitudinal length of 3½ inches, and rotating about 1800 rpm, is 1.8 volts and 72 amps. A power source such as a windmill, waterwheel, Stirling engine, or the like which produces a third horse power is sufficient to drive this embodiment of the generator.

The invention has been described with reference to its preferred embodiment. Obviously, modifications and alterations including variations in the number of segments, number of magnetic pole members, and the like will occur to others upon the reading and understanding of this specification. It is my intention to include all such modifications and alterations insofar as they come within the scope of the appended claims or the equivalents thereof.

Having thus described a preferred embodiment of my invention, I now claim my invention to be:

1. A dynamoelectric apparatus comprising:
   (a) a plurality of pairs of magnetic pole members disposed at angular intervals along a closed path, each pair of magnetic pole members including magnetic pole members of opposite polarity disposed in a spaced relationship such that a gap is defined therebetween, each pair of magnetic pole member producing magnetic flux lines therebetween, whereby the magnetic flux lines across the gap defined between each pair of magnetic pole members;
   (b) a plurality of non-ferrous, conductive segments disposed to pass between the magnetic pole members of each pairs, the conductive segments each having one end thereof electrically connected in common;
   (c) means for allowing relative movement between the pairs of magnetic pole members and the conductive segments such that the conductive segments pass cyclically between the magnetic pole members of each pair, whereby the flux lines are cut by the conductive segments inducing electrical currents therein; and,
   (d) an electrical connecting circuit operatively connected with the other end of the conductive segments for connecting more than two conductive segments electrically in series for all positions of the conductive segment relative to the magnetic pole members, the electrical connecting circuit including a plurality of diodes which interconnect the conductive segment other ends.

2. The dynamoelectric apparatus as set forth in claim 1 wherein the angular interval between two adjacent pairs of magnetic pole members is different from the angular interval between two other adjacent pairs of magnetic pole members.

3. A current generator comprising:
   (a) magnetic pole member supporting means for supporting four longitudinally extending outer magnetic pole members at angular intervals in a generally cylindrical outer pole region and four longitudinally extending inner magnetic pole members in a generally cylindrical inner pole region, each inner magnetic pole members being disposed opposite and spaced from one of the outer magnetic pole members, whereby a cylindrical air gap region is defined between the inner and outer magnetic pole members and magnetic flux lines cross the cylindrical air gap region;
   (b) conductive segment supporting means for supporting 4S non-ferrous conductive segments longitudinally between the inner and outer pole members, the conductive segments each spanning a preselected arc segment, wherein 4S is the product of the interger 4 and an arbitrary interger S, the conductive segments including:
      a first group of S−1 conductive segments,
      a second group of S+1 conductive segments disposed adjacent the first group of segments;
      a third group of S−1 conductive segments disposed adjacent the second group of segments;
      a pair of conductive segments disposed adjacent the third group of segments; and
      a fourth group of S−1 conductive segments disposed adjacent the pair of segments and adjacent the first group of segments;
   (c) means for allowing relative rotational movement between the conductive segment supporting means and magnetic pole member support means, whereby the flux lines are cut by the conductive segments including electrical currents;

(d) an electrical connecting circuit for connecting the conductive segments across an electrical output; and, (e) the outer magnetic pole members being disposed alternately at a first angular interval and a second angular interval, the first angular interval and the second angular interval differing by an even multiple of said conductive segment arc segments.

4. The current generator as set forth in claim 3 wherein the first and second angular intervals differ by twice said conductive segment arc segment.

5. The current generator as set forth in claim 4 wherein a first end of each of the conductive segments is electrically connected;

the electrical connecting circuit includes a plurality of diodes, each diode connecting a second end of one of the conductive segments of the second group of segments with a second end of one of the conductive segments in the third group of segments and the pair of segments; and, the electrical connecting circuit further includes a plurality of electrical connectors, each connector connecting the second end of one of the conductive segments of a third group of segments with a second end of one of the conductive segments in the fourth group of conductive segments.

6. The current generator as set forth in claim 5 wherein the electrical connecting circuit further includes commutator contacts disposed in a fixed spatial relationship to the conductive segments, the number of commutator contacts being the same as the number of conductive segments, and two brushes for cyclically making electrical contact with the commutator contacts, the brushes being disposed in a fixed spatial relationship with the pairs of magnetic pole members, whereby the commutator contacts and the two brushes undergo relative rotational movement with the conductive segments and the inner and outer magnetic pole members.

7. The current generator as set forth in claim 3 wherein the first angular interval is generally 85½° and the second angular interval is generally 94½°.

8. A DC current generator comprising:

(a) a magnetic pole member supporting means for supporting a plurality of pairs of longitudinally elongated magnetic pole members, each pair including an inner magnetic pole member and an outer magnetic pole member which is disposed in a spaced relationship with the inner magnetic pole member such that a gap is defined between each inner and outer magnetic pole member, the inner and outer magnetic pole members being disposed in substantially concentric, generally cylindrical arrays;

(b) a conductive segment supporting means for supporting more than four non-ferrous, conductive segments which are longitudinally elongated and disposed substantially parallel to the magnetic pole members, the conductive segments being disposed side-by-side in a generally cylindrical array and being electrically connected at one end, the conductive segments being disposed to pass between the inner and outer magnetic pole members of each pair;

(c) means for allowing relative rotational movement between the magnetic pole member supporting means and the conductive segment supporting means, whereby the conductive segments cut magnetic flux lines between the inner and outer magnetic pole members inducing electric currents; and, (d) an electrical connecting circuit for connecting at least four of the conductive segments electrically in series across an electrical output, the electrical conducting circuit including a conductive ring which electrically connects together a first end of each segment and a plurality of diodes, each diode interconnecting a second end of one of the conductive segments with a second end of another of the segments.

9. The generator as set forth in claim 8 wherein the electrical connecting circuit includes a plurality of commutator contacts, a first brush and a second brush, the first and second brushes being disposed for electrical connection with the commutator contacts, the first and second brushes and the commutator contacts being mounted for relative rotational movement such that each brush cyclically contacts individual commutator contacts.

10. The generator as set forth in claim 8 wherein the plurality of pairs of magnetic pole members includes four pairs, and wherein the number of conductive segments connected in series is the same as the number of pairs of magnetic pole members.

11. The generator as set forth in claim 10 wherein the conductive segments which are connected in series are the segments which are cutting the flux lines of the pairs of magnetic pole members.

12. The generator as set forth in claim 8 wherein the electrical conducting circuit further includes a plurality of electrical conductors, each conductor interconnecting a second end of yet another of the conductive segments with a second end of still another conductive segment.

13. The generator as set forth in claim 8 wherein the segments are stationarily mounted and the pairs of magnetic pole members rotate.

* * * * *